United States Patent

Bryant et al.

[11] Patent Number: 6,062,697
[45] Date of Patent: May 16, 2000

[54] UNIVERSAL HITCH MIRROR

[76] Inventors: Larry A. Bryant, Rte. 3 Box 784-N, Havana, Fla. 32333; Daryl L. Beadle, 3284 Shannon Lakes N., Tallahassee, Fla. 32308

[21] Appl. No.: 09/133,416

[22] Filed: Aug. 13, 1998

[51] Int. Cl.[7] ............................. G02B 5/08; G02B 7/182; B60R 1/06
[52] U.S. Cl. .................... 359/841; 359/872; 359/881; 248/467; 248/477; 248/479; 248/481; 248/485
[58] Field of Search .................. 359/841, 872, 359/876, 881; 248/467, 474, 477, 479, 481, 484, 485, 486, 487

[56] References Cited

U.S. PATENT DOCUMENTS

| | | |
|---|---|---|
| 661,643 | 11/1900 | Mowry . |
| 1,031,075 | 7/1912 | Lundin . |
| 1,095,448 | 5/1914 | Bongiovanni . |
| 1,868,031 | 7/1932 | Sudbrink . |
| 1,932,697 | 10/1933 | Jankovic . |
| 2,310,353 | 2/1943 | Dettmer . |
| 2,413,894 | 1/1947 | Sorensen ................... 359/881 |
| 2,573,443 | 10/1951 | Holland .................... 359/881 |
| 2,915,944 | 12/1959 | Butts . |
| 3,322,388 | 5/1967 | Budreck . |
| 3,339,876 | 9/1967 | Kampa . |
| 3,346,229 | 10/1967 | Carson, Jr. . |
| 3,377,117 | 4/1968 | Biscow ..................... 359/872 |
| 3,392,950 | 7/1968 | Pierce . |
| 3,428,286 | 2/1969 | Del Pesco . |
| 3,637,186 | 1/1972 | Greenfield . |
| 3,784,149 | 1/1974 | Brudy . |
| 4,105,296 | 8/1978 | Tomlin . |
| 4,218,036 | 8/1980 | Pitkanen . |
| 4,645,170 | 2/1987 | Sharp . |
| 4,856,888 | 8/1989 | Wahl ....................... 248/467 |
| 4,925,287 | 5/1990 | Lord et al. ................ 248/467 |
| 5,042,418 | 8/1991 | Hoover et al. . |
| 5,106,177 | 4/1992 | Dolasia . |
| 5,309,289 | 5/1994 | Johnson .................... 359/871 |
| 5,313,337 | 5/1994 | Byers ...................... 359/872 |
| 5,478,101 | 12/1995 | Roberson ................... 359/872 |
| 5,482,310 | 1/1996 | Staggs ..................... 359/872 |
| 5,784,213 | 7/1998 | Howard .................... 359/872 |
| 5,964,443 | 10/1999 | Leveille . |

Primary Examiner—Ricky D. Shafer
Attorney, Agent, or Firm—John Wiley Horton, Attorney

[57] ABSTRACT

A detachable mirror designed to allow the driver of a vehicle to view the hitch ball when attempting to align the hitch ball with a trailer hitch. The invention has a stable triangular base and an adjustable mast for positioning a small mirror in the correct location.

1 Claim, 5 Drawing Sheets

UNIVERSAL HITCH MIRROR

BACKGROUND

1. Field of Invention

This invention relates to an improved mirror assembly which can be removably attached to a vehicle in order to view a trailer hitch.

2. Description of the Prior Art

When a driver attempts to back a vehicle and align its hitch with a trailer, it is not possible to see the hitch. The driver must often back up a few feet, stop, and get out and walk around to the rear of the vehicle in order to check the alignment. This problem has been recognized for many years, and numerous patents have issued on attempted solutions.

Recognizing that pick-up trucks are often used to tow trailers, several inventions involve methods of mounting a mirror on the tailgate of a pick-up truck. Illustrating this approach are U.S. Pat. No. 4,905,376 to Neeley (1990), U.S. Pat. No. 4,951,913 to Quesada (1990), U.S. Pat. No. 5,478,101 to Roberson (1995), and U.S. Pat. No. 5,550,681 to Mazarac (1996). All these devices mount a mirror to the top of a tailgate. While they are useful for pick-up trucks, they cannot be adapted to other types of vehicles. Another limitation is present as well. The '681, '913, and '376 devices all use frictional contact to hold them against the painted surfaces of the tailgate. As the vehicle moves, the clamping forces exerted by these devices may damage the vehicle's paint finish.

Other inventions have been patented for use on vehicles without a tailgate. U.S. Pat. No. 5,111,342 to Quesada (1992) and U.S. Pat. No. 5,625,500 to Ackerman (1997) are designed to be attached to the rear window of a sport utility vehicle or motor home. The Quesada device uses two suction cups and two suspension arms. The Ackerman device uses a single suction cup with a second adjustable mirror panel. Both devices use a planar mirror, with the result that the mirror must be fairly large to provide the needed field of view. In addition, while both devices are easily attached to a rear glass surface, neither can be attached to a pick-up truck tailgate. They work for sport utility vehicles and RV's, but only for these types of vehicles.

U.S. Pat. No. 4,925,287 to Lord et. al. (1990) discloses a device which can be attached to pick-up trucks, sport utility vehicles, and conventional automobiles. The Lord device uses a pair of suction cups to attach a mirror assembly to a glass or metal surface. It has four adjustable links used to position the mirror in the correct location. Unfortunately, because the invention uses only two suction cups, it is prone to wobble when the vehicles is moved. The fact that it employs so many moveable links also makes it difficult to adjust. Thus, while the '287 device may be applied to a variety of vehicles, it does not provide the needed stability and ease of adjustment.

The known methods for removably mounting a mirror on the rear of a vehicle for viewing a trailer hitch are therefore limited in that they: (1) Are limited to one type of vehicle; (2) Are not sufficiently stable to provide a clear view; (3) May mar the painted surface of the vehicle; and (4) Are difficult to adjust.

OBJECTS AND ADVANTAGES

Accordingly, several objects and advantages of the proposed invention are:

(1) to provide a mounting system that may be attached to any type of vehicle;

(2) to provide a stable mount which will not wobble when the vehicle is in motion;

(3) to attach the mirror to the vehicle in a way that will not mar the vehicle finish; and (4) to provide a means of adjustment which is easy to use.

These objects and advantages will be fully explained in the details hereafter described, explained, and claimed, with reference being made to the accompanying drawings.

DRAWING FIGURES

REFERENCE NUMERALS IN DRAWINGS

| | | | |
|---|---|---|---|
| 10 | base | 12 | mast boss |
| 14 | base bolt | 16 | cup nut |
| 17 | cup hole | 18 | suction cup |
| 20 | cup bolt | 22 | base wingnut |
| 24 | mast | 26 | ball bolt |
| 27 | ball pocket | 28 | ball slot |
| 30 | ball wingnut | 32 | mirror mount |
| 34 | attachment ball | 36 | mast pivot |
| 38 | mast shaft | 40 | mast mounting hole |
| 42 | base mounting hole | 44 | engagement teeth |
| 46 | ball bolt hole | 48 | pick-up truck |
| 50 | sport utility vehicle | 52 | hitch ball |
| 54 | universal hitch mirror | 56 | mirror |
| 58 | pivot mating surface | 60 | boss mating surface |
| 62 | side wall | 65 | cup bore |
| 66 | triangle vertex | | |

Figure 1:
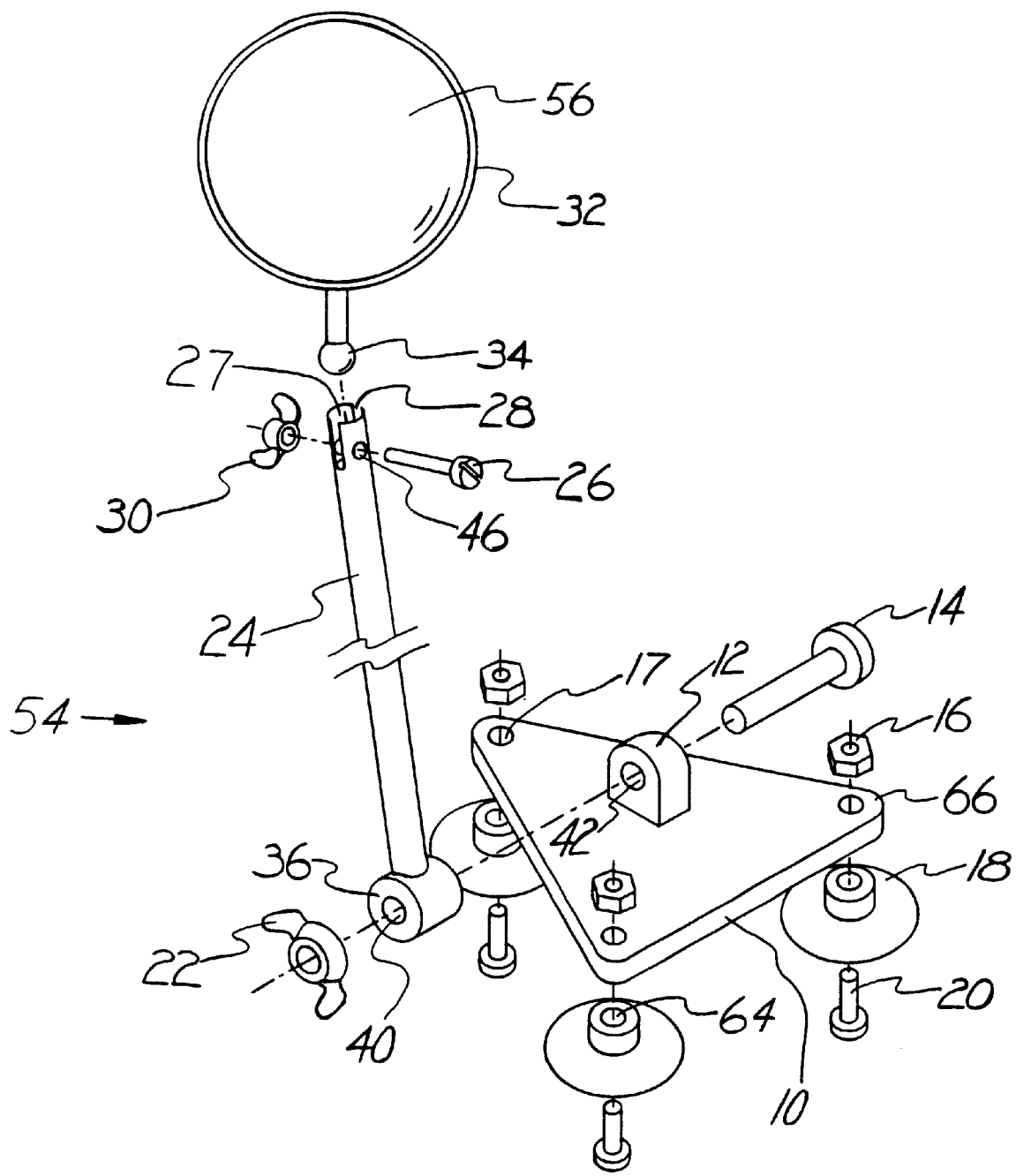
FIG. 1 is an exploded isometric view, showing how the components of the proposed invention are assembled.
Figure 2:
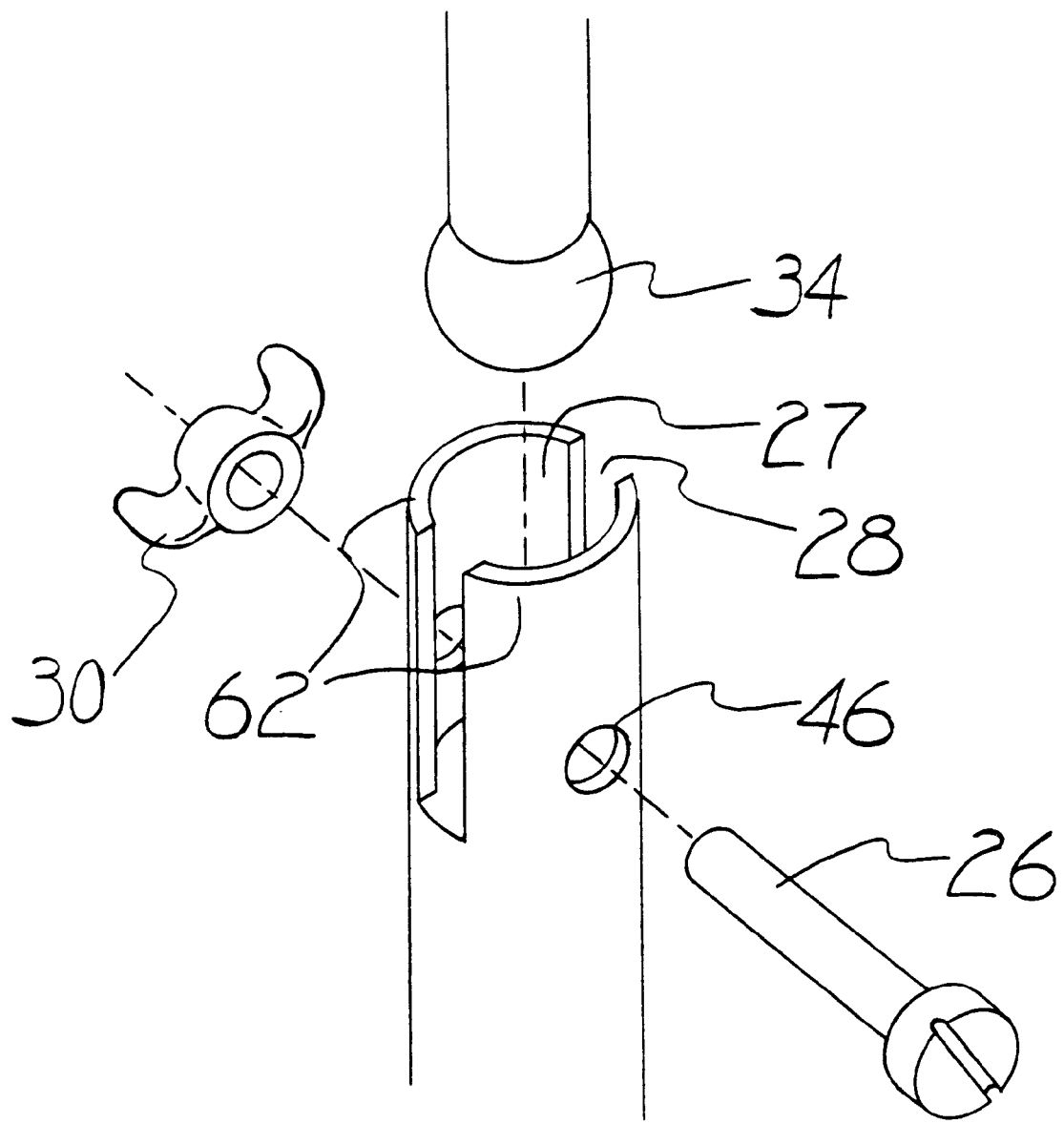
FIG. 2 is a detail isometric view, showing how the mirror is attached to the mast.
Figure 3:
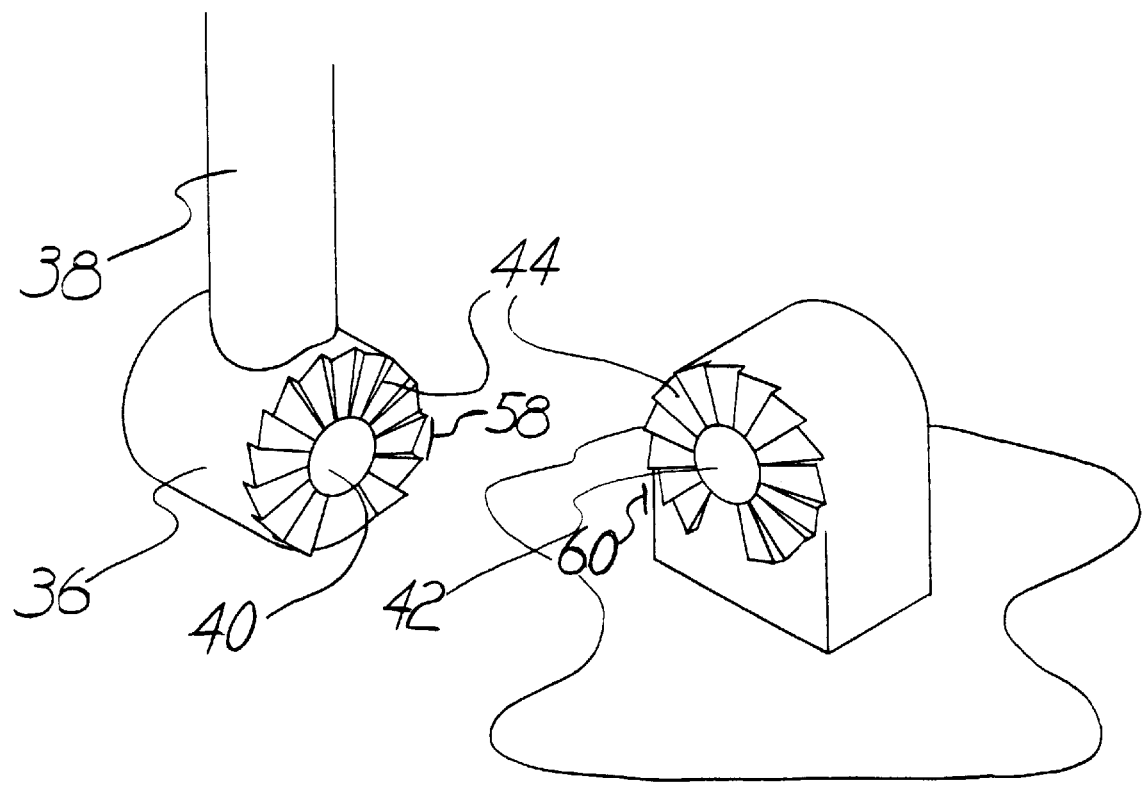
FIG. 3 is a detail isometric view, showing how the mast is attached to the base.

Description—FIGS. 1 to 3

FIG. 1 is an exploded view showing all the components of the invention and how they fit together. Base 10 is an integral molded piece, having a triangular shape. Three cup holes 17, which extend completely through base 10, are located near the triangle vertices 66 of the triangular shape as shown. Three suction cups 18 are attached to base 10 using cup bolts 20 and cup nuts 16. The threaded portion of cup bolt 20 is passed through cup bore 64 of suction cup 18, through cup hole 17, and then threaded into cup nut 16. The head portion of cup bolt 20 is too large to pass through the cup bore 64 of suction cup 18. The outer diameter of cup nut 16 is too large to pass through cup hole 17. As cup nut 16 is tightened, suction cup 18 is drawn firmly against the lower surface of base 10. Using this technique, all three suction cups 18 are permanently attached to base 10.

On its upper surface, base 10 has integrally-molded mast boss 12. Mast boss 12 is provided for the attachment of mast 24, which is formed in the shape of an elongated cylinder. Mast boss 12 has base mounting hole 42 passing completely through it. Mast mounting hole 40 passes completely through the lower end of mast 24, with its central axis being aligned with the central axis of base mounting hole 42. The threaded portion of base bolt 14 is passed through base mounting hole 42, through mast mounting hole 40, and out the other side. The head portion of base bolt 14 is too large to pass through base mounting hole 42. Base wingnut 22 is threaded onto the exposed threaded portion of base bolt 14. As base wingnut 22 is tightened, the lower end of mast 24 is drawn snugly against mast boss 12. Mast 24 may be angularly adjusted relevant to base 10 by loosening base wingnut 22, rotating mast 24, and then re-tightening base wingnut 22.

As detailed in the preceding, mast 24 is attached on its lower end to base 10. Mast 24 is attached on its upper end to mirror mount 32. Turning now to FIG. 2, ball pocket 27 is formed in the upper end of mast 24. Ball slot 28 is cut through side wall 62 of ball pocket 27, in order to bifurcate side wall 62 into two sections. Ball bolt hole 46 is cut through both sections of side wall 62, in a direction transverse to ball slot 28. The threaded portion of ball bolt 26 is passed completely through ball bolt hole 46, and extended out the other side of mast 24. The head portion of ball bolt 26 is too large to pass through ball bolt hole 46. Ball wingnut 30 is threaded onto the exposed portion of ball bolt 26.

Returning briefly to FIG. 1, the reader will observe that mirror mount 32 has attachment ball 34. The attachment of mirror mount 32 to mast 24 is detailed in FIG. 2. Attachment ball 34 is sized to fit tightly within ball pocket 27. Once attachment ball 34 is placed in ball pocket 27, ball wingnut 30 is tightened in order to clamp the two sections of side wall 62 together, thereby locking attachment ball 34 and mirror mount 32 is position. When ball wingnut 30 is loosened, mirror mount 32 may be easily rotated into any desired position. Ball wingnut 30 is then re-tightened to lock mirror mount 32 into the desired position. Mirror 56 is fixedly attached to mirror mount 32. Once mirror mount 32 is fixed in a desired position, mirror 56 will likewise be locked in place.

Mast 24 is fairly long, and it carries the weight of mirror mount 32 and mirror 56 on its end. As the invention is moved about, base wingnut 22 may loosen and allow mast 24 to shift out of the desired position. A locking feature was therefore needed. Turning to FIG. 3, the locking feature will be explained.

The lower end of mast 24 has cylindrically-shaped mast pivot 36. When mast 24 is attached to mast boss 12, pivot mating surface 58 mates with boss mating surface 60. FIG. 3 shows mast 24 rotated ninety degrees out of its normal position, in order to allow the simultaneous depiction of pivot mating surface 58 and boss mating surface 60. Engagement teeth 44 are provided on both pivot mating surface 58 and boss mating surface 60. When the two surfaces are forced tightly together by the action of base wingnut 22, the opposing engagement teeth 44 lock together and prevent mast pivot 36 from rotating relevant to mast boss 12.

The use of engagement teeth 44 prevents continuous angular adjustment of mast pivot 36 relevant to mast boss 12. The angle may only be set in discrete increments. It is therefore advantageous to provide numerous engagement teeth 44 spaced no more than twenty degrees apart.

While material selection is not critical to the invention, certain observations should be disclosed. Base 10 is preferably molded from a thermoplastic polymer, such as ABS. It can be cast from metal, but the use of a polymer is found to be lighter and cheaper. Mast 24 is also preferably molded from a thermoplastic polymer. Because it is long and thin, the strength provided by a fiber-reinforced polymer is advantageous for this component. As the invention will be stored for long periods of time in a vehicle, the materials selected should be resistant to heat and ultraviolet radiation.

Figure 4:
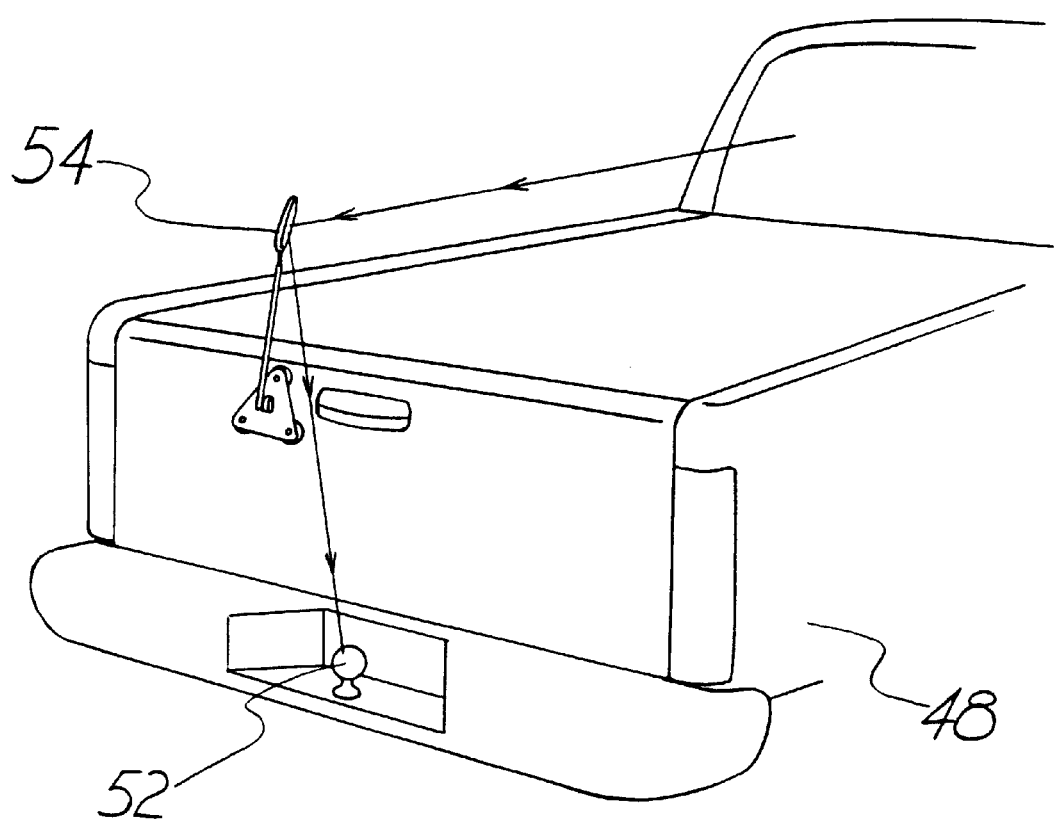
FIG. 4 is an isometric view, showing how the assembled invention mounts on a pick-up truck.
Figure 5:
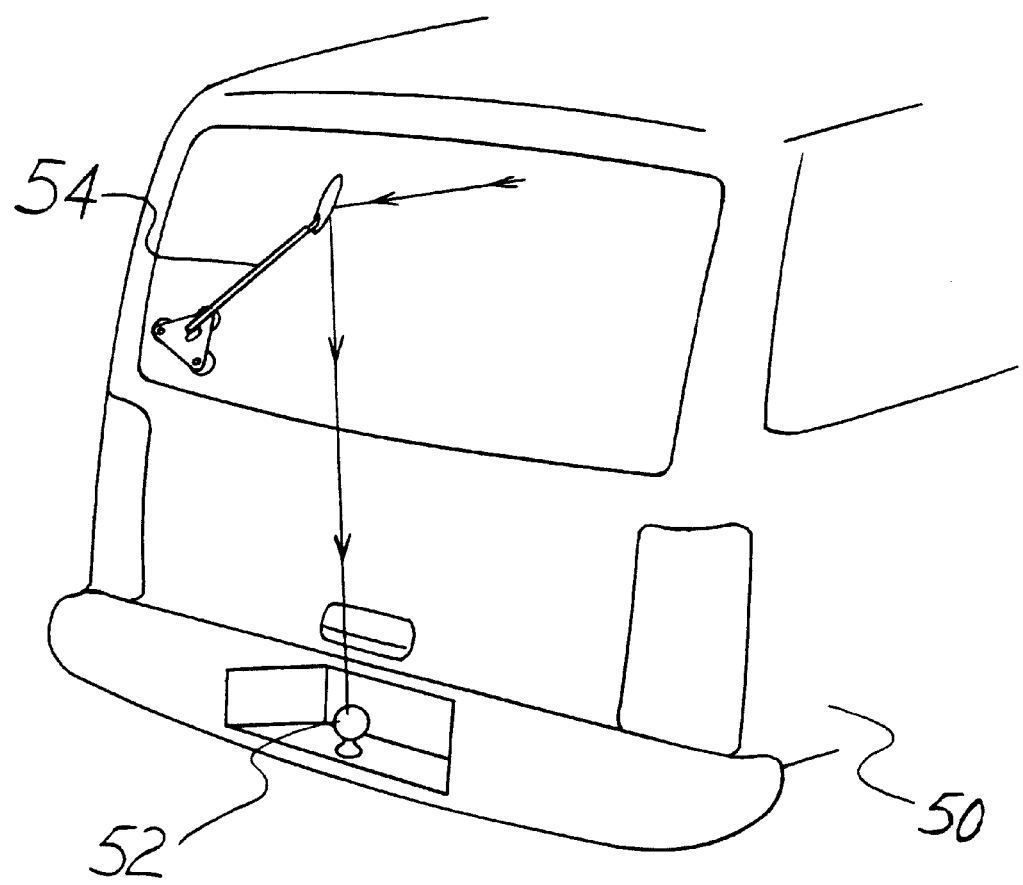
FIG. 5 is an isometric view, showing how the assembled invention mounts on a sport utility vehicle.

Operation—FIGS. 4 and 5.

The invention is delivered to the user as an assembled unit. As disclosed in the preceding, the invention is adapted for use on virtually any type of vehicle. FIG. 4 illustrates the use of the invention with a pick-up truck. The user grasps universal hitch mirror 54 and presses suction cups 18 against a flat surface of the tailgate, as shown. Having attached universal hitch mirror 54, the user first loosens base wingnut 22 to allow the appropriate positioning of mast 24, and then loosens ball wingnut 30 to allow the appropriate positioning of mirror assembly 32. Mirror assembly 32 must be positioned to allow the driver of the pick-up truck to see hitch ball 52. A correct positioning is illustrated, with the line of sight being depicted by the arrows.

FIG. 5 illustrates the application of universal hitch mirror 54 to a sport utility vehicle. The user grasps universal hitch mirror 54 and presses suction cups 18 against the rear window, as shown. In the case of some sport utility vehicles, the user may prefer to mount the invention on a metal surface. Either method will work. The user then adjusts universal hitch mirror 54, as described in the preceding, in order to provide a clear line of sight from the driver to hitch ball 52.

The reader will appreciate that universal hitch mirror 54 may also be attached to the trunk of a conventional automobile, and many other types of vehicles. As these variations are apparent to one skilled in the art, they have not been illustrated.

SUMMARY, RAMIFICATIONS, AND SCOPE

Accordingly, the reader will appreciate tat the proposed invention gives the user the ability to attache a hitch viewing mirror to virtually any type of vehicle. The invention has additional advantages in that:

1. It provides a very stable mount which will not wobble when the vehicle is in motion;
2. It attaches to the vehicle in a way that will not mar the finish; and
3. It is very easy to adjust to an appropriate position, and the invention will remain locked in that position.

Although the preceding description contains significant detailed information, it should not be construed as limiting the scope of the invention but as providing illustrations of some of the preferred embodiments. Thus, the scope of the invention should be fixed by the following claims, rather than by the examples given.

Having described our invention, we claim:

1. A universal hitch mirror designed to be attached to a rear surface of a vehicle in order to allow a driver of said vehicle to view a trailer hitch, comprising:

a base, being planar and triangular in shape, having an upper surface and a lower surface;

means for securing said base to said rear surface of said vehicle;

a mast, in the shape of an elongated cylinder, having an upper end and a lower end;

a mast boss, integrally formed with said base and extending upward from said upper surface of said base, and having a boss mating surface;

a mast pivot, integrally formed on said lower end of said mast, and having a pivot mating surface directly opposing said boss mating surface of said mast boss, wherein said pivot mating surface of said mast pivot and said opposing boss mating surface of said mast boss are each provided with a plurality of engagement teeth, so that said mast pivot cannot rotate relative to said mast boss when said pivot mating surface is drawn tightly against said opposing boss mating surface;

wherein said boss mating surface of said mast boss opens into a base mounting hole passing completely through said mast boss;

wherein said pivot mating surface of said mast pivot opens into a mast mounting hole passing completely through said mast pivot, with the central axis of said mast mounting hole being aligned with the central axis of said base mounting hole;

wherein said pivot mating surface is drawn tightly against said opposing boss mating surface by the engagement of a base bolt and a base wingnut, with said base bolt having a threaded portion and a head portion, with said threaded portion of said base bolt being sized to pass through said base mounting hole and said mast mounting hole, and being sufficiently long to leave an exposed threaded portion of its length extending beyond said mast boss and said mast pivot, and with said head portion of said base bolt being sufficiently large to prevent its passage through said base mounting hole and said mast mounting hole, and with said base wingnut being threaded on to said exposed threaded portion of said base bolt, thereby drawing said pivot mating surface and said boss mating surface together;

a mirror; and means for adjustably securing said mirror to said upper end of said mast; wherein said means for adjustably securing said mirror to said upper end of said mast comprises a mirror mount, fixedly attached to said mirror; an attachment ball, integrally formed with said mirror mount; a ball pocket, formed into the upper end of said mast, defined by a bifurcated side wall, and sized to receive said attachment all of said mirror mount; and means for clamping said bifurcated side wall against said attachment ball so as to frictionally hold said attachment ball in position in said ball pocket.

* * * * *